June 2, 1942.  E. ABENDROTH  2,285,136
ELECTRIC CONDENSER
Filed Dec. 15, 1939

Inventor:
Erich Abendroth,
by Harry E. Dunham
His Attorney.

Patented June 2, 1942

2,285,136

UNITED STATES PATENT OFFICE 2,285,136

ELECTRIC CONDENSER

Erich Abendroth, Berlin, Germany, assignor to General Electric Company, a corporation of New York Application December 15, 1939, Serial No. 309,461
In Germany January 27, 1939

10 Claims. (Cl. 175—315)

The present invention relates to improvements in construction and terminal arrangement for electrical condensers.

The invention may be employed to advantage in the construction of various forms of condensers, both electrostatic and electrolytic, but has particular importance and advantages when employed in the construction of electrolytic condensers which have large electrode surface but small overall dimensions so as to require special manufacturing and mounting precautions. Due to the constant effort being made to reduce the overall size of electrolytic condensers, particularly "dry" electrolytic condensers, of a given rating and capacity, manufacturing difficulties have been encountered. Among these are the difficulty of adequately insulating the closely adjacent connection lugs and terminals from each other, and from the metal enclosing casing when such is employed.

Among the objects of the present invention is the avoidance of such difficulties by provision of an improved terminal support and terminal arrangement having, among others, the advantages of insuring proper insulation of the connection lugs and terminals and of avoiding undesirable strain on the lugs both during manufacture of the condenser and while the condenser is in service.

Other objects and the details of that which I consider to be novel and my present invention will be apparent from the following description and the claims appended thereto, taken in conjunction with the accompanying drawing in which is shown an exemplary embodiment of the invention as incorporated in a condenser of the "dry" electrolytic type.

Figure 1:
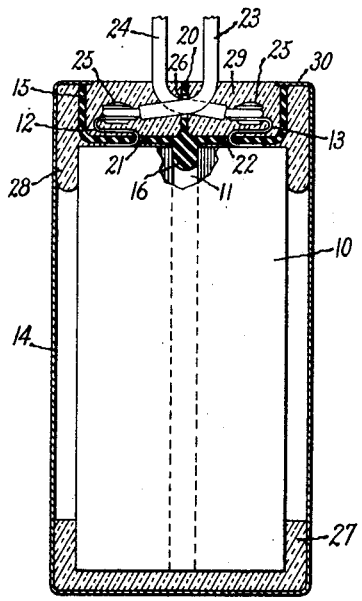
Figure 2:
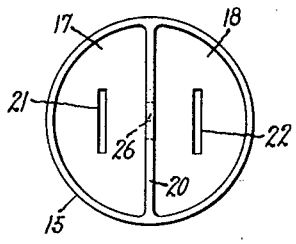

In the drawing, Fig. 1 is a side elevation, partially in section, of the exemplary condenser, while Fig. 2 is a top plan view of the improved terminal support and closure member employed in the condenser of Fig. 1 in accordance with the present invention.

For purposes of illustration, the condenser of the exemplary embodiment is shown as including a condenser body 10 of well known form and comprised of a plurality of electrode foils wound with suitable spacing material into a compact roll having a central longitudinally extending opening 11, the spacing material being impregnated with any suitable semi-fluid or plastic electrolyte as is common in "dry" electrolytic condensers. However, as will be understood from the ensuing description, the present invention is not limited to the particular condenser body illustrated, but may be employed with other forms of electric capacity units, either electrostatic or electrolytic, and of either single or multiple section design. The illustrated condenser roll has two connection lugs, designated 12 and 13, which are connected respectively with the electrode foils of the roll, and the roll is enclosed in a tubular casing or can 14 which is open at one end and is comprised of aluminum or other suitable metal.

In accordance with the present invention, there is provided an improved casing closure and terminal supporting and insulating member 15, which is of cylindrical and generally cup-shaped form, and which is comprised of insulation material. This member 15 is disposed in the open end of casing 14 with the open top of the member facing outwardly. The bottom of member 15, which is in contiguity with the end of roll 10, is provided exteriorly with a boss 16 which projects into the end of opening 11 in the condenser roll so as to prevent lateral displacement of member 15 relative to the condenser roll. Thus, the member 15 has a surface engaging with the adjacent surface of the condenser body. The interior of member 15 is divided into two separate compartments 17 and 18 by means of a transversely extending upright partition 20 which is formed integrally with member 15. In the bottom of member 15 are two apertures, in the form of slots 21 and 22 extending substantially parallel with partition 20, which communicate respectively with compartments 17 and 18. Connection lugs 12 and 13 extend respectively through slots 21 and 22 into compartments 17 and 18 respectively. If there is employed, instead of the capacity body illustrated, a multi-section capacity body having more than two connection lugs, as will be understood by one skilled in the art, the interior of member 15 may be partitioned to provide more than two compartments so as separately to accommodate each of the connection lugs.

In the assembly of the condenser, connection lugs 12 and 13 are threaded respectively through slots 21 and 22, from the outside of member 15 into compartments 17 and 18, respectively. Member 15 then is pressed down firmly onto the end of condenser roll 10, care being taken to see that boss 16 properly enters the opening 11 in the condenser roll so as to prevent shifting of member 15 relative to the condenser roll. The bared ends of two insulation covered wire leads 23 and 24 are secured to the ends of connection lugs 12 and 13, respectively, by suitable means, such as by riveting, as indicated at 25. Leads 23 and 24 are passed, in reverse directions, through an opening 26 in partition 20, and are bent into substantially parallel extending relationship for connection purposes, as indicated on the drawing. Opening 26 preferably is of such dimensions that the terminal leads are held relatively tightly therein. If desired, separate openings may be provided in partition 20 for individually accommodating leads 23 and 24, and, also, means may be provided for wedging the leads fixedly in the opening or openings in partition 20.

Condenser roll 10, member 15, and leads 23 and 24, when assembled as previously described, constitute a unit adapted to be inserted into the metal can or casing 14. Either before or after insertion of the unit into the metal can, compartments 17 and 18 in member 15 are filled with suitable insulating compound in molten or plastic form. This compound, indicated at 29, when solidified serves firmly to anchor the junctions between the leads and connection lugs, relative to member 15 and also to seal the openings 21 and 22 around the connection lugs 12 and 13. Also, a suitable insulating filling compound, in molten or plastic form, is placed in can 14 so that, when this latter compound solidifies, it insures proper anchoring and sealing of the unitary condenser assembly in the can. Although the filling compound of the illustrated exemplary embodiment is shown as being confined to the bottom and top portions of the can as indicated at 27 and 28, respectively, it may be made to fill the whole space around the condenser unit or may be made to assume any other form and arrangement desired. Also, the sealing and anchoring of the condenser unit in the can may be rendered more effective and permanent by spinning or crimping the rim of the can over the rim of member 15, as indicated at 30.

From the foregoing it will be seen that the connection lugs and terminal leads are maintained in positions wherein they are adequately spaced and insulated from each other, since the leads and lugs are firmly anchored in their respective compartments and relative to member 15, which member in turn is firmly anchored relative to the condenser body and enclosing casing. Thus, undesirable strain on the connection lugs and electrode foils is avoided, which is of particular importance in electrolytic condensers which usually employ relatively thin metallic foils for the lugs and electrodes. A further advantage of the described construction is that the compound 29, while providing additional insulation of the lugs and leads and sealing of the openings 21 and 22, also prevents corrosion at the junctions between the connection lugs, which usually are aluminum, and the terminal leads, which usually are copper.

Modifications of the particular arrangement which I have disclosed embodying my invention will occur to those skilled in the art, so that I do not desire my invention to be limited to the particular arrangement set forth and I intend in the appended claims to cover all modifications which do not depart from the spirit and scope of my invention.

What I claim as new and desire to secure by Letters Patent of the United States is:

1. In an electric condenser, the combination of a condenser body, a cup-shaped member disposed in contiguity therewith and comprised of insulation material, which said member has partition means dividing the interior of the member into a plurality of separate compartments and the bottom portion of which member has spaced apart openings communicating respectively with said compartments, said condenser body having a plurality of flexible connection lugs extending from said body respectively through different ones of said openings into separate ones of said compartments, a plurality of terminal leads terminating respectively in separate ones of said compartments and connected respectively with separate ones of said lugs, and insulating compound solidly embedding and anchoring the junctions between said leads and said lugs in said compartments, said insulating compound sealing said openings in the bottom of said member.

2. In an electric condenser, the combination of a condenser body, an insulating member of generally cup-shaped form having a bottom and upstanding walls defining a plurality of separate compartments interiorly of said member, said member being disposed with its bottom in contiguity with said condenser body and its open top facing generally away from the condenser body, said body having a plurality of connection lugs extending therefrom respectively through apertures in said member into separate ones of said compartments, a plurality of terminal leads terminating respectively in separate ones of said compartments and connected respectively with separate ones of said lugs, each of said leads entering its respective terminal compartment through a restricted aperture in a wall of said member, and insulating compound relatively solidly embedding the ends of said lugs and said leads in said compartments.

3. In an electric condenser including a condenser roll having a substantially centrally disposed longitudinally extending opening and having a plurality of flexible connection lugs extending from one end of the roll, a cup-shaped insulating member disposed adjacent said one end of the roll with the open top of said member facing away from the roll, which said member has partition means dividing the interior of the member into a plurality of separate compartments and the bottom of which member has a plurality of apertures communicating respectively with said compartments, said connection lugs extending from said condenser roll respectively through said last mentioned apertures into separate ones of said compartments, the bottom of said member engaging with the end of said roll, and means including a projection on the bottom of said member and extending into said opening in said roll for restraining said member against displacement relative to the roll.

4. An electric condenser comprising in combination, a casing having an open end, a condenser body in said casing and having a plurality of flexible connection lugs adjacent said end of the casing, closure means for said end of the casing including an insulating member of generally cup-shaped form having a bottom and upstanding walls defining a plurality of separate compartments interiorly of said member, means relatively fixedly securing said member at said open end of the casing with the bottom of the member in contiguity with said condenser body and the open top of the member facing outwardly, said connection lugs extending from said condenser body respectively through separate openings in the bottom of said member into separate ones of said compartments, a plurality of terminal leads terminating respectively in separate ones of said compartments and connected respectively with separate ones of said connection lugs, insulating compound embedding the junctions between said lugs and the ends of said leads in said compartments, and means including said compound relatively firmly anchoring said leads with respect to said member.

5. A condenser comprising a metal casing having an open end, a condenser body in said casing, an insulating member arranged in said casing between said condenser body and said open end, the inner surface of said insulating member engaging with a substantial portion of an adjacent surface of said condenser body, said insulating member having an outer wall portion extending substantially parallel with and spaced from the walls of said casing, plastic insulating compound substantially sealing the space between said casing and said wall portion of said insulating member, compartments in the upper surface of said insulating member, connection lugs for said condenser body extending into corresponding recesses, flexible leads having connections with corresponding of said lugs, and plastic insulating compound in said compartments covering said connections.

6. An electric condenser comprising a metal casing having an open end, a condenser body arranged in said casing, an insulating member arranged in said casing between the open end and said condenser body, said member having a surface engaging with the adjacent surface of said condenser body, means sealing the space between said insulating member and said casing, said casing having flanged portions engaging with the upper portion of said insulating member, compartments in the upper surface of said insulating member, connection lugs for said condenser body extending into corresponding compartments, flexible leads extending into said compartments, connections between said leads and said lugs, and plastic insulating material in said compartments covering said connections.

7. A condenser comprising a metal casing having an open end, a condenser body arranged in said casing, an insulating member arranged in said casing between said open end and said condenser body, one surface of said insulating member engaging with the adjacent surface of said condenser body, a flange on the upper end of said casing engaging with the upper surface of said member securely clamping said condenser body in said casing, compartments in the upper surface of said insulating member, connection lugs from said condenser body extending into said compartments, flexible leads having connections with said lugs, plastic insulating material filling said compartments and covering said connections.

8. An electric condenser comprising a metal casing having an open end, a condenser body in said casing, an insulating member arranged in said casing and engaging with the upper surface of said condenser body, plastic insulating material between said insulating material and said casing substantially filling the space therebetween, the upper edge of said casing being flanged over and engaging with the edge of said insulating member clamping said condenser body securely in said casing.

9. An electric condenser comprising a metal casing having an open end, a condenser body in said casing, a cup-shaped insulating member having a bottom end and integral side walls arranged in said casing with the open end thereof facing outwardly and the bottom end engaging with the upper surface of said condenser body, the upper edge of said casing flanged inwardly over the upper edge of said insulating member securing said condenser body firmly in said casing.

10. An electric condenser comprising a metal casing having an open end, a condenser body in said casing, a cup-shaped insulating member having a bottom end and integral side walls arranged in said casing with the open end thereof facing outwardly and the bottom end engaging with the upper surface of said condenser body, the upper edge of said casing flanged inwardly over the upper edge of said insulating member securing said condenser body firmly in said casing, said cup-shaped insulating member having a partition with an opening, and a terminal lead adapted to be connected to said condenser body and extending through said opening.

ERICH ABENDROTH.